United States Patent
Fujii et al.

(10) Patent No.: US 6,504,815 B1
(45) Date of Patent: Jan. 7, 2003

(54) OPTICAL INFORMATION MEDIUM, STAMPER FOR MANUFACTURING TRANSPARENT SUBSTRATE THEREFOR AND RECORDING METHOD THEREFOR

(75) Inventors: Toru Fujii, Tokyo (JP); Emiko Hamada, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/504,267

(22) Filed: Feb. 15, 2000

(30) Foreign Application Priority Data

Feb. 23, 1999 (JP) .......................................... 11-044299

(51) Int. Cl.⁷ .............................................. G11B 11/00
(52) U.S. Cl. .................................. 369/275.4; 428/64.4
(58) Field of Search ........................... 369/275.4, 275.2, 369/277, 248, 272; 428/64.1, 64.4

(56) References Cited

U.S. PATENT DOCUMENTS

| | | | |
|---|---|---|---|
| 5,604,726 A | 2/1997 | Karube | |
| 5,852,599 A | * 12/1998 | Fuji | .......................... 369/275.4 |
| 5,933,411 A | * 8/1999 | Inui et al. | ................. 369/275.4 |
| 6,256,266 B1 | * 7/2001 | Mitani | ........................... 369/13 |

FOREIGN PATENT DOCUMENTS

| | | |
|---|---|---|
| JP | 4-195939 | 7/1992 |
| JP | 9-17029 | 1/1997 |
| JP | 9-102143 | 4/1997 |
| JP | 9-259439 | 10/1997 |
| JP | 9-326138 | 12/1997 |

* cited by examiner

Primary Examiner—Tan Dinh
(74) Attorney, Agent, or Firm—Flynn, Theil, Boutell & Tanis, P.C.

(57) ABSTRACT

An optical information medium is made up of a transparent substrate for a recording laser beam to penetrate therethrough, a recording layer formed on the transparent substrate, and a reflective layer for reflecting reproducing laser beam formed thereupon enabling the recording of optically readable signals by means of an incident recording laser from the transparent substrate. The transparent substrate has spiral-like tracking guides on the surface of the transparent substrate on which is formed the recording layer, and pre-pits indicative of address information are formed on a land portion defined between the tracking guides. The pre-pits are formed shifted from a center of the land. With this construction, the pre-pits open to a side of the tracking guide neighboring the land. With this, it is possible to read out address signals from the pre-pits with certainty when recording, and also to suppress errors due to mixing between the signals obtained from the pre-pits indicative of the address information and the recorded data read out from the pits on the tracking guides when reading the recorded optically readable signals.

14 Claims, 4 Drawing Sheets

OPTICAL INFORMATION MEDIUM, STAMPER FOR MANUFACTURING TRANSPARENT SUBSTRATE THEREFOR AND RECORDING METHOD THEREFOR

BACKGROUND OF THE INVENTION

1. FIELD OF THE INVENTION

The present invention relates to an optical information medium, a transparent substrate and a stamper for use in the manufacture thereof, and a recording method therefor, on which can be recorded information that is optically reproducible, and in particular, relates to an optical information medium having a sector address information detection means therein, and is suitable for a high density recording medium on which the information can be recorded and reproduced with a red laser beam of a short wavelength of from 630 nm to 670 nm.

2. DESCRIPTION OF RELATED ART

With the recent advances in development and application of a short wavelength laser, standardization has proceeded on the standard for DVDs (Digital Versatile Discs) which enables recording and reproducing at a high density, as well as the practical application thereof. On the DVD is provided a data recording area on at least one surface thereof, in which pits are formed as a means for recording information, and a reflection layer made of a metal film is formed on the data recording area.

For the DVDs, a different standard for high density is determined, compared to the standard for the optical information medium being the most general or popular now, such as a CD (Compact Disc). For example, with the optical pickup, it is determined to use the red laser of short wavelength from 630 nm to 670 nm, and to use an objective lens of a high numerical aperture, such as of 0.6 in NA, etc.

Also, accompanying with this, for dealing with a curve or bend of the disc, the thickness thereof is determined to be 0.6 mm, about half (½) of that of the CD. However, for maintaining a compatibility or interchangeability in sizes between a CD having a thickness of 1.2 mm, the disc of DVDs applies such structure that two discs are aligned and pasted together. According to the DVD standard, it is standardized that one disc have a recording capacity of 4.7 GB at the maximum, in average, i.e., video and audio information for approximately 133 minutes.

Up to now, with a recordable CD, such as CD-R, etc., address information, i.e., ATIP (Absolute Time in Pregroove) is obtained through FM modulation of wobbling of the spiral groove tracking guide. In contrast to this, with a recordable DVD, such as a DVD-R, etc., the address information, including position information on the optical information medium or the like, is given by means of pre-pits which are provided in advance on a land portion between the tracking guides, and the wobbling as well, in place of the ATIP.

The pre-pits which are applied to the DVD-R as the high density recording medium mentioned above can be read out by the optical pickup together with the pits of the recorded signal, however, in this instance, the optical pickup is controlled by a tracking servo along with the tracking guide. Therefore, under a normal condition, the pre-pits are read out distinct from the pits for the recording of the data signals which are formed on the groove. However, depending upon the shapes, sizes and so on thereof, the pre-pits may be read out mixed with RF signals which are obtained from the pits for the recording of the data signals. In this case, it may be a cause of the occurrence of errors in reading of the data signals.

In the DVD-R and/or DVD-RW, the pre-pits are necessary for obtaining address information such as the position information on the optical information medium when recording. However, though they are not used when reproducing, the fact that the signals obtained from the pre-pits are mixed into the RF signals indicative of the recorded data may be the cause of the occurrence of the errors in the reading of the RF data signals.

On the other hand, if it is difficult to read out the pre-pits when recording, information, such as the address, cannot be read out correctly during the recording, therefore the recording comes to be unstable, and there remains a problem that the reproduction itself of the recorded signals is unstable.

SUMMARY OF THE INVENTION

In accordance with the present invention, taking into consideration those problems accompanying with the reading of the pre-pits for reading the address information of the optical information medium in conformity, such as a high density recording, an object thereof is to provide an optical information medium, a substrate for use of the optical information medium and a stamper for forming the substrate, with which the address information can be read out from the pre-pits with certainty when recording, including information on shifting when the pickup is shifted to a starting position of the recording after accessing a non-recorded area, and the error is removed or dissolved in reading due to interference between the signal obtained from the pre-pits indicative of the address information and the recorded data read out from the pits on the tracking guide, thereby enabling the prevention of the mixing of the signal obtained from the pre-pits into the data signal when being reproduced.

For accomplishing the object mentioned above, according to the present invention, the pre-pits 6 provided on the land for indicating the address information are intentionally shifted from the land 8, thereby increasing the intensity of the tracking error signal, as well as weakening the leakage into the RF signal, so as to discriminate between the tracking error signal and the RF signal which is obtained from the pits on the grooves 3, and preventing them from being erroneously read out with each other.

According to the present invention, there is provided a stamper, comprising concave and convex-like steps formed in a concentric or a spiral shape thereof, wherein in the concave portion of said stamper is formed a projection portion in such a manner that the projection portion is connected to at least one of the convex portions adjoining said concave portion.

Also, according to the present invention, there is provided a substrate for use in an optical information medium, formed from a resin by a stamper comprising concave and convex-like steps formed in concentric or a spiral shape thereof, wherein on said substrate is provided pre-pits indicating address information, formed by means of a projection portion, which is provided on the concave portion of said stamper in such manner that the projection portion is connected to at least one of the convex portions adjoining the concave portion.

According to the present invention, there is provided an optical information medium, comprising: a transparent substrate 1 for a recording laser beam to penetrate therethrough, a recording layer 12 formed on said transparent substrate;

and a reflective layer 13 for reflecting reproducing laser beam thereupon, thereby enabling the recording of optically readable signals by means of an incident recording laser beam from said transparent substrate 1, wherein said transparent substrate has spiral-like tracking guides 3 on a surface thereof, on which the recording layer 12 is formed, and pre-pits 6 indicative of address information, formed on a land 8 defined between the tracking guides 3, and wherein the pre-pits 6 are formed by shifting from a center of the land 8. Thereby, the pre-pits 6 are opened to the side of the tracking guide 3 neighboring the land 8. On such an optical information medium, the optically readable signals are recorded by tracking the incident recording laser beam from said transparent substrate 1 along said tracking guide 3.

In the optical information medium using the substrate for an optical information medium, which is formed by the stamper, since the pre-pits 6 are formed shifted from the center of the land 8, in more detail, the pre-pits 6 are formed shifted from the center of the land 8, in more detail, the pre-pits 6 are formed shifted from the center of the land 8 in a direction of an inner periphery of the disc, then the pre-pits are formed in such a manner that they come nearer to the center of the beam spot when tracking, therefore it is possible to obtain an amplitude of the signal as the reproduced signal of the pre-pits, larger than that in a case where the pre-pits are formed at the center of the land, thereby performing the reading with certainty.

Also, with the construction mentioned above, it is possible to make the shape of the pre-pits 6 smaller than that in the case where the pre-pits are formed at the center of the land. This is caused by the fact that it is possible to obtain a larger signal amplitude than in the case where the pre-pits are formed at the center of the land, because the pre-pits 6 are off-set from the center of the land 8 in the inner periphery direction of the disc, as mentioned previously. In this case, since the pre-pits 6 can be made physically smaller in shape up to such a level that the signal amplitude thereof can be read out (for example, at the signal amplitude when the pre-pits 6 are formed at the center of the land 8), even in the case where the signal due to the pre-pits leaks into the RF signal, it comes to be sufficiently smaller than the time duration of the minimum signal as the data signal when it is decoded into an EFM signal, therefore, it is easy to discriminate it from the data signal, thereby preventing the erroneous reading of the signal due to the pre-pits.

For example, when reading the data pits formed on the tracking guide 3 while conducting the tracking servo on the optical pickup along with the tracking guide 3, the address signal obtained from the pre-pits 6 becomes weaker than the signal obtained from the data pits. Thereby, the signal of the pre-pits 6, which is mixed into the RF signal obtained from the data pits, becomes weak. Therefore, there hardly occurs the problem of mixing of noises into the data signal.

The pre-pits 6 are preferably shifted in the direction of the inner periphery of the transparent substrate 1, with respect to the center of the land. This is because, as was mentioned previously, the pre-pits are formed in such a manner that they come close to the center of the beam spot more when tracking, therefore, the reproduced signal of the pre-pits obtains the amplitude of a signal larger than that in the case where the pre-pits are formed at the center of the land.

The pitch p of the tracking guide 3 is p=0.74 $\mu$m, and the half-width w thereof is preferably within a range, 0.23 $\mu$m$\leq$w$\leq$0.38 $\mu$m. The half-width d of the pre-pit 6 is preferably within a range, 0.20 $\mu$m$\leq$d$\leq$0.33 $\mu$m. From this relationship, the ratio w/d between the half-width w of the tracking guide 3 and the half-width d of the pre-pits 6 is within a range, 0.5 $\leq$w/d$\leq$1.7. The off-set dimension $\delta$ of the pre-pit 6 from the center of the land 8, depending upon the width of the land 8, is preferably within a range, 0 $\mu$m$\leq\delta\leq$0.2 $\mu$m, and the width 1 from the boundary portion between the tracking guide 3 and the land 8 to the pre-pit 6 preferably lies within a range, 0 $\mu$m$\leq$1$\leq$0.2 $\mu$m.

As mentioned above, with the optical information medium according to the present invention, wherein the signals can be recorded onto the optical information medium in conformity with the high density recording optically with the optical pickup, the address signal can be read out from the pre-pits with certainty when recording, and when reading out the recorded signals, errors are eliminated in reading the signals obtained from the land pre-pits indicative of the sector information and the recorded data read out from the pits on the tracking guide, thereby enabling the reading of the address information when recording and the data signals when reproducing, with accurate discrimination between them.

DESCRIPTION OF THE PREFERRED EMBODIMENTS

Hereinafter, detailed explanation of the embodiments according to the present invention will be given by referring to the attached drawings.

Figure 1:
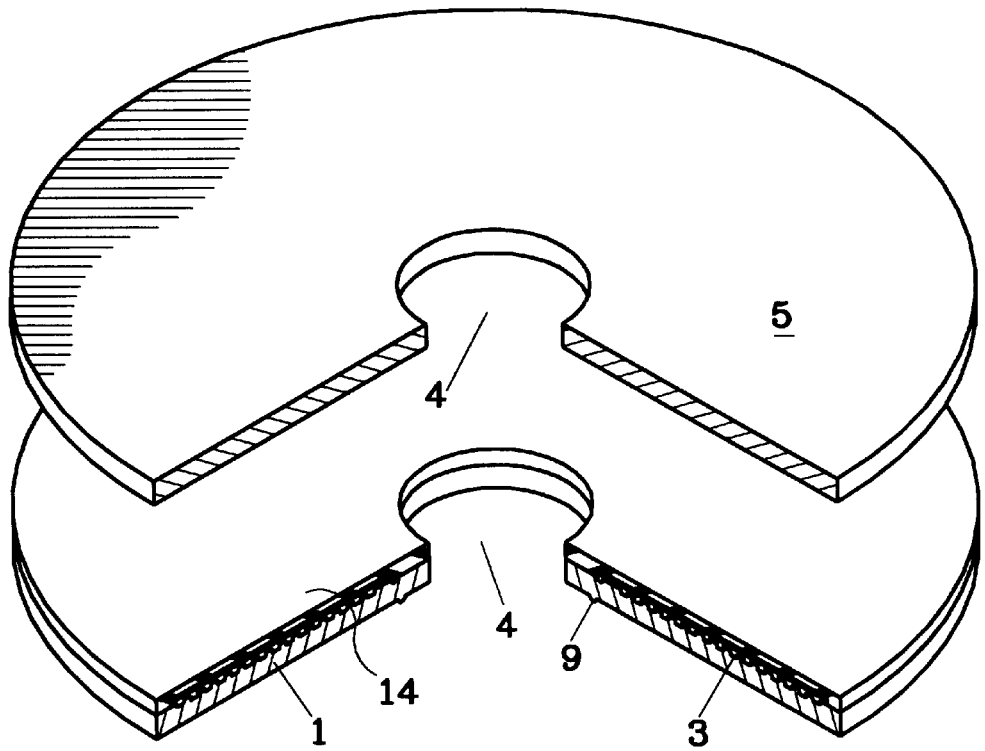
FIG. 1 is an exploded perspective view of two substrates in an example of an optical information medium according to the present invention, before they are pasted together, including a partial cross-section view thereof.
Figure 2:
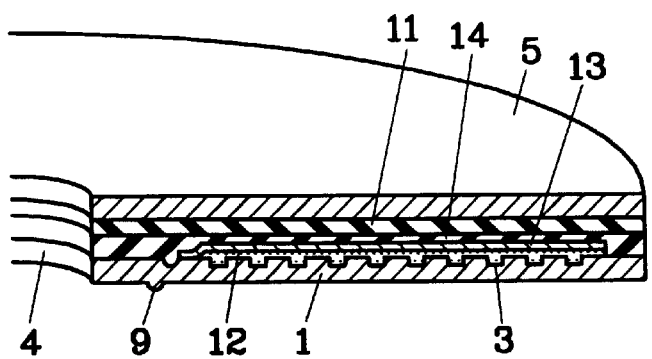
FIG. 2 is a perspective view of showing the same optical information medium, including a partial cross-section view thereof.

A write-once optical information medium is shown in FIGS. 1 and 2, which is pasted on both surfaces and is recordable and reproducible from one surface thereof, as an example of an optical information medium according to the present invention.

A transparent substrate 1 is a substrate in a disc-like shape, having a center hole 4 in the central portion thereof. This transparent substrate 1 is most preferably made of a transparent resin, such as a polycarbonate, polymethyl methacrylate (PMMA), etc., by means of injection molding.

Figure 7:
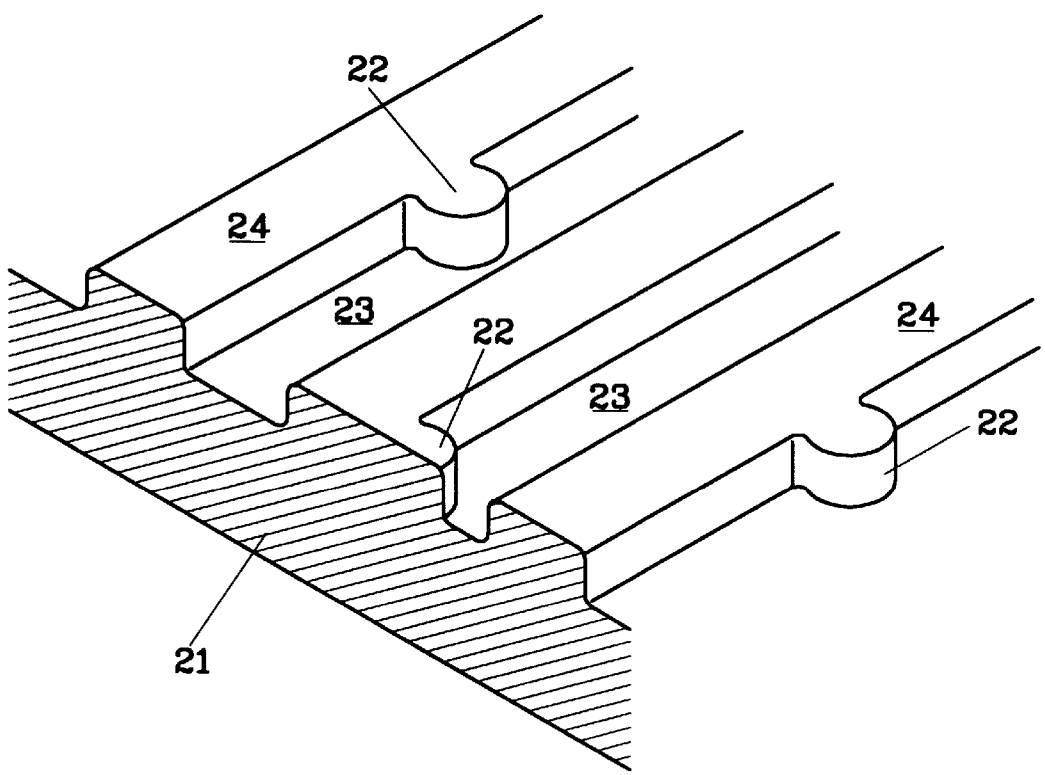
FIG. 7 is a perspective view of a stamper.

Here, when forming the transparent substrate 1, a stamper 21 is used, on which concave/convex like steps are formed in a spiral-like shape, as shown in FIG. 7. In the concave portion 23 of the stamper 21 is provided a projection portion 22, which is connected with at least one of the convex portions 24 adjacent to the concave portion 23, in this embodiment, connected to an inner periphery side thereof.

However, in the portion which is connected between the projection portion 22 and the convex portion, there may be formed a hang or a rise in the shape thereof.

In a substrate formed from a resin by this stamper 21, a projecting land 8 is formed on the substrate 1 by a concave portion 23 of the stamper 21, while a concave tracking guide 3 is formed on the substrate 1 by a projection portion 24 of the stamper 21. Further, a concave-like pre-pit 6 indicative of address information is formed on the substrate 1 by a projection portion 22 formed in the concave portion 23 of the stamper 21 to be connected with the convex portion 24 thereof. The pre-pit 6 is formed in a portion of the land 8 adjoining the tracking guide 3 to be connected with the tracking guide 3 on the substrate 1.

On the surface of the substrate 1 having the transparency, and outside of the above-mentioned center hole 4, there is provided a clamping area, and in an outside area thereof is formed a data recording area or region. In the data recording area of the transparent substrate 1 is formed a tracking guide 3 with a spiral-like groove(s). The pitch of the tracking guide 3 is 0.74 $\mu$m as a standard thereof.

As shown in FIGS. 3 to 6, on the land 8 between the tracking guides 3 mentioned above, recess-like pre-pits 6 indicative of the address information are formed at an appropriate distance therebetween when recording the signals onto the optical information medium. Those pre-pits 6 are formed in advance, together with the tracking guides mentioned above, when forming the transparent substrate 1 by injection molding.

As is indicated in those Figs., the pre-pits 6 are formed by shifting by an off-set dimension $\delta$ with respect to the center of the land 8. Therefore, the pre-pits 6 are open at the edge on one side of the land 8. All the shiftings of the pre-pits 6 with respect to the center of the land 8 are in the same direction, in the example shown in the Figs., at the left-hand side of the land in the FIG. 3, i.e., being open at the side of the inner periphery of the land 8. End portions 6a are formed on the border of the pre-pits 6. In the portion being opened is formed a projection-like rim 7. The depth of this rim 7 is lower than the depths of the tracking guide 3 and the pre-pits 6, namely the height of the land 8 from the bottom surface of the tracking guide 3. This rim 7 may be formed by interrupting on the way thereof.

Since this rim portion is lower than the height of the land, contribution to the reflection amount of laser beam upon the land portion is decreased when irradiated with the laser beam thereupon. For bringing an amplitude of the LPP signal obtained in this instance to the maximum, the less the reflected amount of laser beam upon the land portion, the more advantageous. Therefore, the rim is preferably low.

The off-set dimension $\delta$ of the above-mentioned pre-pits with respect to the center of the land 8, depending upon the width of the land, is preferably within a range, $0\mu m \leq \delta \leq 0.2$ $\mu$m, while also the width 1 from the boundary portion between the tracking guide 3 and the land 8 to the pre-pit 6 is preferably within a range, $0\mu m \leq 1 \leq 0.2$ $\mu$m. Further, the pitch of the tracking guide 3 is p=0.74 $\mu$m, and a half-width w thereof is within a range, $0.23\mu m \leq w \leq 0.38$ $\mu$m.

The diameter d of this pre-pit 6 is different from the length of the pits which are formed when recording the signals onto the optical information medium. For example, in DVDs, the length of the data pits are about from 0.4 $\mu$m to 1.9 $\mu$m, however, the diameter d of the pre-pit 6 is determined to be shorter than the minimum pit length 0.4 $\mu$m. In more detail, the diameter d of the pre-pit 6 is determined to be from 50% to 83% of the minimum pit length. For example, in DVDs, the minimum pit length should be that of three (3) channel clocks, however the length of the pre-pit 6 is determined to be equal to the length of 1.5 to 2.5 channel clocks. As the specific values, the diameter d of the pre-pit 6 is determined to be within a range, $0.20\ \mu m \leq d \leq 0.33$ $\mu$m. With this relationship, the ratio w/d between the half-width w of the tracking guide 3 and the half-width d of the pre-pit 6 is within a range, $0.5 \leq w/d \leq 1.7$. With this construction, it is possible to obtain a necessary signal for each of the pre-pits formed on the tracking guide 3 and the data pits formed on the land, without interference between them, therefore enabling the suppression of leakage of the signals into the data due to the signals on the pre-pits.

Figure 3:
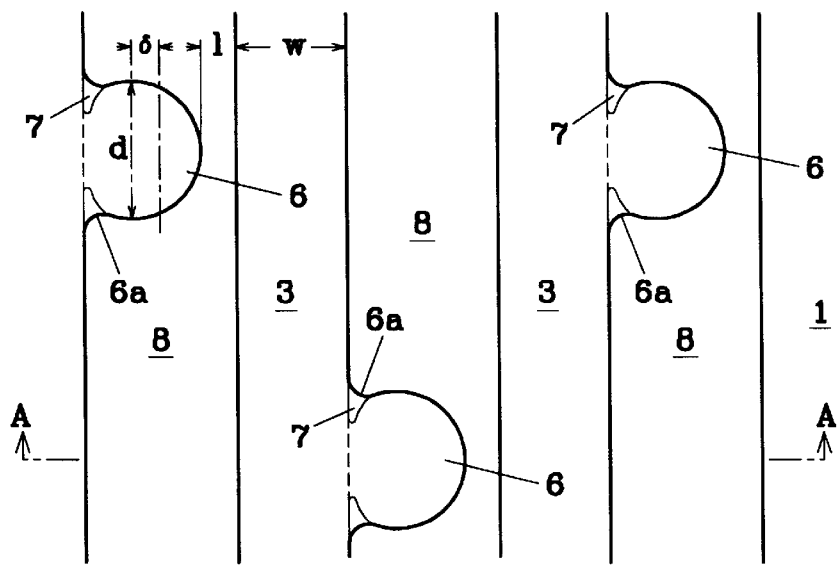
FIG. 3 is a plane view of a principle portion of a transparent substrate which is applied to the same optical information medium.
Figure 4:
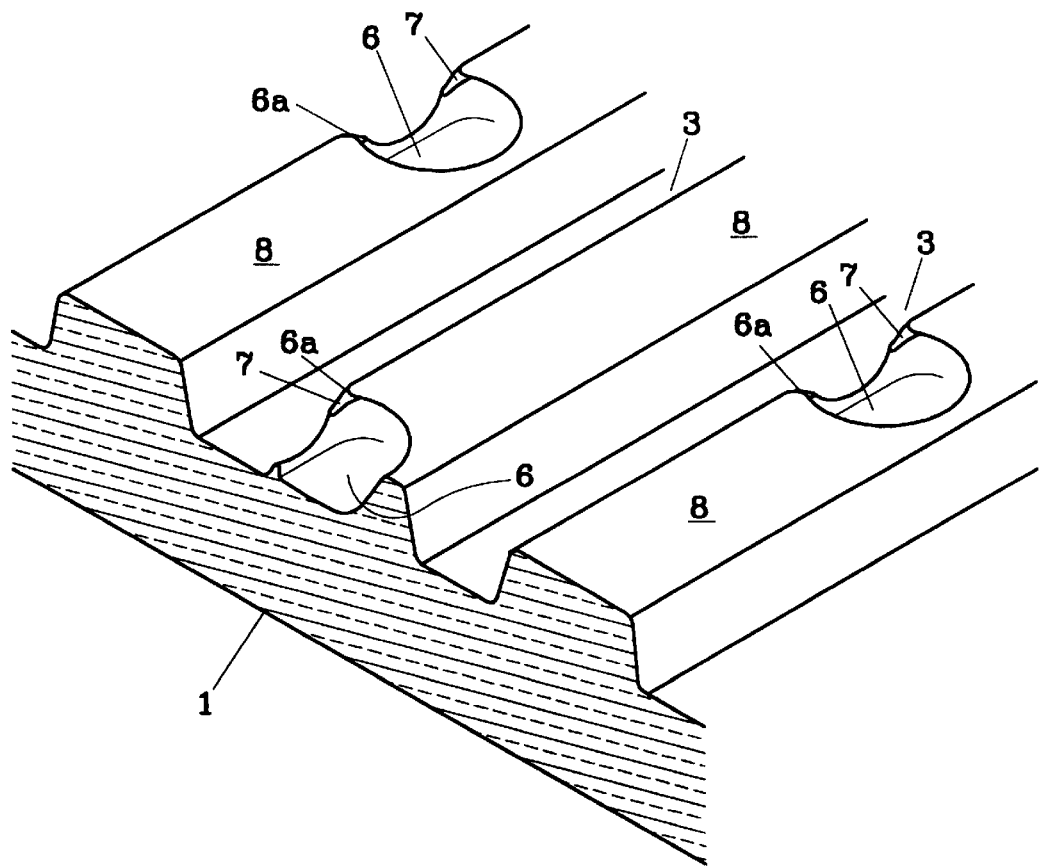
FIG. 4 is a perspective view of the transparent substrate, including a cross-section view which is cut along a line A—A in FIG. 3.

Also, as shown in FIG. 3, the pre-pit 6 is preferably formed curvilinearly directing to an outside of the outer periphery of the pre-pit, when seen from a plane view thereof, so that it contacts with the boundary portion between the tracking guide 3 and the land 8. With such a configuration, the surface of the pre-pit 6 is enlarged in the shape thereof in that portion, and the contribution of the land portion to the amount of the reflection laser beam, when seen from the optical view point thereof, comes to be small, then it is possible to make the amplitude of the pre-pit signal large. Therefore, it is possible to maintain or ensure the output of the pre-pit signals obtained when the pre-pit is in a standard shape thereof, even in a case where the shape of the pre-pit is changed to be smaller than that of the standardized shape thereof, thereby enabling the reduction of errors in reading the pre-pit signals.

Further, as shown in the FIGS. 1, 2, 5 and 6, on the portion of the main surface of the data recording area is formed or coated a recording layer 12. The recording layer 12 is formed, for example, by applying or painting organic dye by means of a spin coat method or the like.

Figure 5:
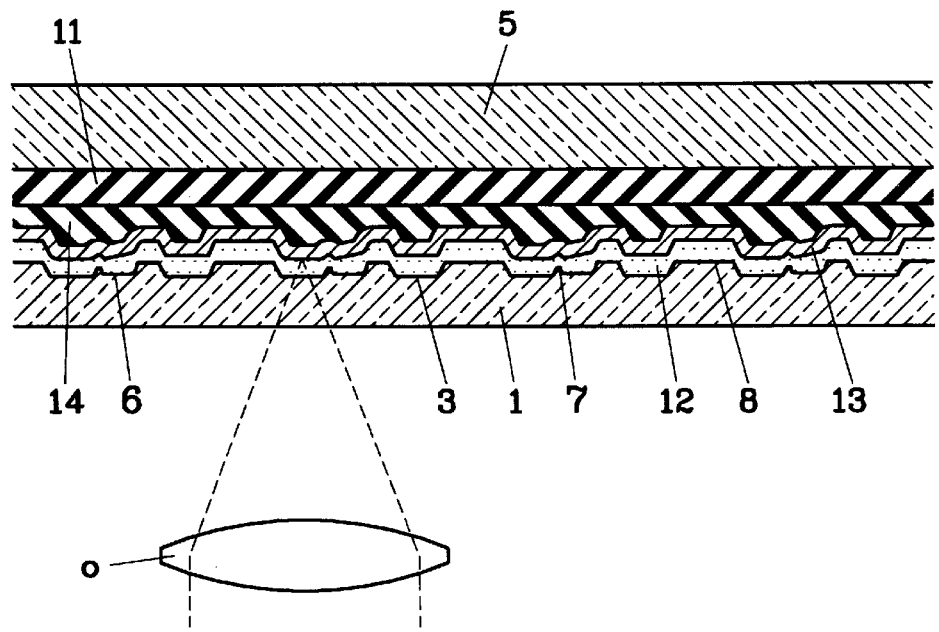
FIG. 5 is a vertical side cross-section view of the principle portion of the same optical information medium.
Figure 6:
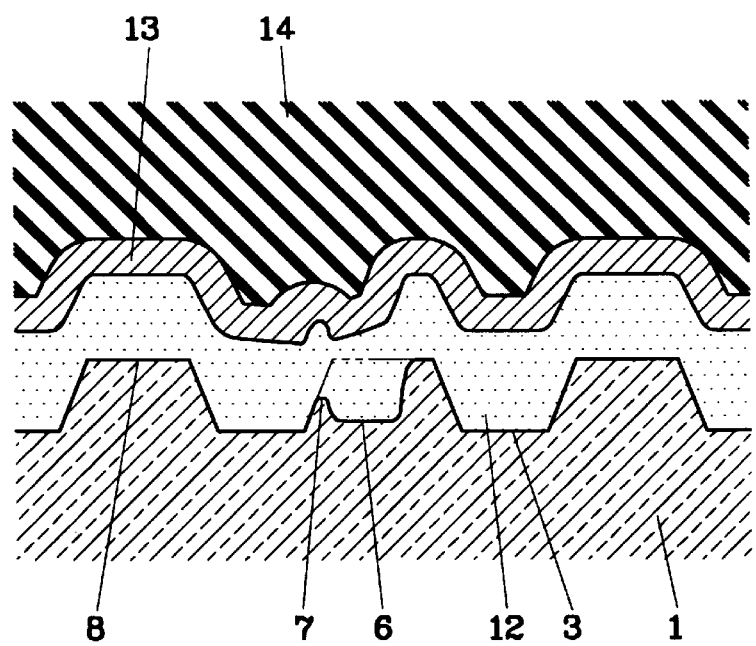
FIG. 6 is an enlarged vertical side cross-section view of the principle portion of the same optical information medium.

FIGS. 5 and 6, each shows the cross-section in the radial direction of the transparent substrate 1. As is apparent from the FIG. 6, the pre-pit 6 is at the left-hand side, namely shifted to the inner periphery side of the disc, and as a result of this, the left-hand side of the land 8 is open. Further, in the portion open at a side of the land 8 of the pre-pit 6, there is formed a projection-like rim 7 shallower than the depth of the tracking guide 3.

Here, the laser beam, in general, shows the strongest intensity at the center in a regular distribution thereof. If the pre-pits 6 are off-set to the inner periphery of the land 8 as mentioned above, since the pre-pit 6 is close to the center of the beam when tracking, it is possible to obtain a greater diffraction intensity than that obtained when the pre-pit is located at the center of the land.

However, the pre-pits 6 mentioned above are provided for the purpose of obtaining signals to be the address information of the optical information medium. By using those pre-pits 6 in common, it may be possible to obtain rotation control information with the wobbling of the tracking guide 3.

As shown in the FIGS. 1, 2, 5, and 6, on the recording layer 12 formed in the manner as mentioned above is formed a reflective layer 13 from a metal film of gold, aluminum, silver, copper, etc., or a layer of an alloy thereof. Furthermore, on the reflective layer 13 is formed a protection film 14, such as of an ultraviolet ray curable resin.

As shown in the FIGS. 1 and 2, a substrate 5 is prepared other than the transparent substrate 1. This substrate 5 is made of the same material as the transparent substrate 1, as well as having the same size. However, it is not provided with the tracking guide 3, the recording layer 12 and the reflective layer 13 on the main surface thereof, as is provided on the transparent substrate 1 mentioned above. Of course, on the other substrate 5 may be provided the tracking guide, the recording layer 12 and the reflective layer 13, in the similar manner as the transparent substrate 1 mentioned above.

Next, the two substrates 1 and 5 are aligned and pasted together. For example, a reactive curable resin is applied or coated on the main surface of at least one of the two substrates 1 and 5 as an adhesive, by means of a spin coat method or the like, and is hardened after they are aligned and pasted together with those surfaces opposing each other. In this manner, the two substrates 1 and 5 are bonded together at the main surfaces thereof, with an adhesive layer 11 formed by hardening the above-mentioned reactive curable resin. In this instance, the transparent substrate 1 is adhered on the surface, on which the recording layer 12 and the reflective layer 13 are formed.

In the example mentioned above, on the transparent substrate 1, formed with the recording layer 12 and the reflective layer 13 and having the tracking guide 3 thereon, is pasted the other substrate 5 not having a recording layer 12 and reflective layer 13 thereon. In this instance, the recording and/or reproducing can be performed only on one side surface thereof. The other substrate 5 may have no transparency, be colored for maintaining a durability against a laser beam, or have a region on the surface, where letters or patterns can be written in.

On the other hand, preparing two pieces of the transparent substrates 1, each being formed with the recording layer 12 and the reflective layer 13 and having the tracking guide 3 thereon, it is also possible to paste them together with the recording layer 12 and the reflective layer 13 opposed to each other, so as to obtain an optical information medium, with which the recording and/or reproducing can be performed on both surfaces thereof.

However, in FIGS. 1 and 2, a reference numeral 9 indicates a ring-like projection formed outside of the data recording area on the side surface of the transparent substrate 1, upon which the recording laser beam is incident. This is for the purpose of protecting the recording surface of the optical information medium from touching with the surface of the other one, when the plurality of the optical information media are aligned.

Next, examples of the present invention will be explained by referring to specific numerical values thereof.

Embodiment 1

Applying a photosensitizer (i.e., photo-resist) upon the glass substrate, which is polished, a cutting process is performed by running the laser beam spirally from the inner periphery to the outer periphery thereof, while rotating the glass substrate. The cutting machine is called LBR (Laser Beam Recorder) and has a krypton-argon laser of a wavelength of from 351 nm to 458 nm as the laser beam source thereof. This laser beam is spotted spirally upon the photoresist layer being rotated with wobbling, by using a mastering signal which is treated by a photo-converter, which can adjust the intensity of the penetrating laser beam electrically. In this instance, the laser beam passing through an irradiation path which is separately provided is turned ON/OFF at a predetermined timing, and the exposed portion of the photosensitive layer is dissolved into a developing liquid for exclusive use thereof, so as to form the concave-like gutters and the pre-pits in that portion. Thereafter, a conductive material is coated upon the surface of it so as to make it as an electrode(s) for conducting Ni plating on the surface of the photosensitive layer. Removing that, a master stamper is completed. Further, the plating is performed upon the surface using the master stamper as the electrode(s), in the same manner as mentioned above, thereby enabling a mother stamper to be obtained by removing the plating.

By molding the thermoplastic with the stamper as is obtained in this manner, a transparent substrate 1 is prepared from a polycarbonate substrate of 120 mm $\Phi$ in outer diameter, 15 mm $\Phi$ in inner diameter, 0.597 mm in thickness, and 1.59 in refractive index and having grooves 3 for tracking on one side of the main surfaces 0.31 $\mu$m in half-width, 140 nm in depth, and 0.74 $\mu$m in pitch. On a portion of the lands 8, each being defined between the tracking guides 3, are formed a plurality of pre-pits 6, 0.27 $\mu$m in half-width of the diameter d and within 0.02 $\mu$m in the fluctuation thereof. Those pits 6 are shifted by 0.1 $\mu$m at the maximum, 0.05 $\mu$m at the minimum, and only by 0.07 $\mu$m on the average thereof.

On the side surface of the transparent substrate 1, having the groove 3 thereon, the recording layer 12 is formed by the spin coat film forming of a solution of cyanine dye.

Further, Au is spattered onto the recording layer 12 so as to form the reflective layer 13 therewith. On this, an ultraviolet ray curable resin (SD 211 of Dainippon Ink Chemical Industry Co., Ltd.) is coated by the spin coating and is hardened by irradiating the ultraviolet ray on it, so as to form the protection layer 14 therewith. On this protection layer 14, applied with an adhesive of ultraviolet ray curable resin, the substrate is aligned and pasted together, having the same material and size as that mentioned above. The ultraviolet ray is irradiated upon the adhesive to harden it, thereby producing the optical information medium.

On the optical information medium manufactured in this manner, when trying to read out the address signals with the optical pickup (NA=0.6), the address information can be taken out with stability. Also, an 8/16 modulation signal (converting 8 bits into 16 bits) is recorded with the same system, at a recording power of 10 mW. When trying to reproduce the optical information medium by a DVD player after being recorded, a PI error within the data signals is only 3 counts per 8 ECC blocks (an average value per one (1) minutes) emitting the laser beam of 637 nm, therefore the reproduction is possible with stability. The modulation amplitude of the recorded signal is 61%, the maximum value of length errors of the pit and land is 6.0 nsec for each signal, and the data to clock jitter is 7.5%, respectively, thereby obtaining good or preferable results.

Embodiment 2

The optical information medium is manufactured in the same manner as that of Example 1 mentioned above, but the diameter of the land pre-pits 6 is set to be 0.28 $\mu$m in half-width thereof, within a fluctuation of 0.02 $\mu$m.

On the optical information medium manufactured in this manner, when the sector information is read out with using the optical pickup (NA=0.6) emitting the laser beam of wavelength of 650 nm, the address information can be read out with stability. Further, the 8/16 modulated signals (converted from 8 bits to 16 bits) are recorded at a recording power of 10.5 mW with using the same system. When the optical information medium is reproduced by the DVD player after the recording thereof, the PI error in reading the data signals is five (5) counts per 8 ECC blocks (an average value per a minute), i.e., obtaining stable reproduction. The modulation amplitude of the signals recorded is 65%, the maximum value of errors in the lengths of the pits and lands is 5.8 ns and the jitter is 7.3%, thereby obtaining the preferable result.

Comparison Example 1

The optical information medium is manufactured in the same manner as Example 1 mentioned above, but an offset amount of the pre-pit from the center of the land 8 in the direction of an outer periphery of the disc is 0.1 μm, the half-width d of the land pre-pit 6 is 0.41 μm, and the half-width w of the tracking guide 3 is 0.20 μm, (the ratio between the half-width d of the land pre-pit 6 and the half-width of the tracking guide 3, w/d=0.49).

On the optical information medium manufactured in this manner, when the sector information is read out with the optical pickup (NA=0.6) emitting a laser beam of wavelength of 650 nm, the address information can be read out with stability. Further, the 8/16 modulated signals (converting from 8 bits to 16 bits) are recorded at a recording power of 10.0 mW, using the same system. When the optical information medium is reproduced by a DVD player after the recording thereof, the PI error in reading the data signals is three-hundred (300) counts per 8 ECC blocks (an averaged value per minute), i.e., in an undesirable condition for reproduction of the data. The modulation of amplitude of the signals recorded is 65%, the maximum value of errors in the lengths of the pits and lands is 6.5 ns and the jitter is 9%, respectively.

Comparison Example 2

The optical information medium is manufactured in the same manner as Example 1 mentioned above, but the shifting of the pre-pits 6 on the land is 0.3 μm at the maximum, 0.2 μm at the minimum, and 0.25 μm at the average thereof.

On the optical information medium manufactured in this manner, when the address information is read out with the optical pickup (NA=0.6) emitting the laser beam of wavelength of 650 nm, no address information can be read out therefrom.

What is claimed is:

1. A stamper for forming an optical information medium, said stamper comprising concave portions provided in a surface thereof for forming convex land portions on a substrate of the optical information medium and convex portions formed on the surface thereof for forming a spiral concave tracking guide in the substrate of the optical information medium, said stamper convex portions having protuberances formed thereon which extend into said stamper concave portions and form recessed pre-pits in the convex land portions for indicating address information and a groove is provided between said protuberances and said stamper convex portions to form a convex rim between said pre-pits and said tracking guide.

2. A substrate for forming an optical information medium, said substrate comprising convex land portions provided on a surface thereof, a spiral concave tracking guide provided in the surface, recessed pre-pits for indicating address information formed in said convex land portions and a convex rim provided between said pre-pits and said tracking guide.

3. An optical information medium comprising: a transparent substrate for allowing a recording laser beam to penetrate therethrough, said transparent substrate comprising convex land portions provided on a surface thereof, a spiral concave tracking guide provided in the surface, recessed pre-pits for indicating address information formed in said convex land portions off-center with respect to said convex land portions and a convex rim provided between said pre-pits and said tracking guide; a recording layer formed on the transparent substrate; and a reflective layer formed on the recording layer for reflecting a reproducing laser beam.

4. An optical information medium as claimed in claim 3, wherein end portions of said pre-pits are formed in a direction opposed to an inner side of the pre-pits, from a plane view thereof, and the end portions curvilinearly contact with a boundary portion between the tracking guide and the land portions.

5. An optical information medium as claimed in claim 3, wherein the pre-pits are shifted in an inner peripheral direction of the transparent substrate, with respect to the center of the land portions.

6. An optical information medium comprising: a transparent substrate for allowing a recording laser beam to penetrate therethrough, said substrate comprising convex land portions provided on a surface thereof, a spiral concave tracking guide provided in the surface, recessed pre-pits for indicating address information formed in said convex land portions offset a distance δ from the center of the convex land portions, $0\,\mu m \leq \delta \leq 0.2\,\mu m$; a recording layer formed on the transparent substrate; and a reflective layer formed on the recording layer for reflecting a reproducing laser beam.

7. An optical information medium comprising: a transparent substrate for allowing a recording laser beam to penetrate therethrough, said substrate comprising convex land portions provided on a surface thereof, a spiral concave tracking guide provided in the surface, recessed pre-pits for indicating address information formed in said convex land portions off-center with respect to said convex land portions, a width l from a boundary portion between the tracking guide and a land portion to a pre-pit being within a range, $0\,\mu m \leq l \leq 0.2\,\mu m$; a recording layer formed on the transparent substrate; and a reflective layer formed on the recording layer for reflecting a reproducing laser beam.

8. An optical information medium comprising: a transparent substrate for allowing a recording laser beam to penetrate therethrough, said substrate comprising convex land portions provided on a surface thereof, a spiral concave tracking guide provided in the surface, recessed pre-pits for indicating address information formed in said convex land portions off-center with respect to said convex land portions, a ratio w/d between a half-width w of the tracking guide and a half width d of a pre-pit on a land portion being within a range of $0.5 \leq w/d \leq 1.7$; a recording layer formed on the transparent substrate; and a reflective layer formed on the recording layer for reflecting a reproducing laser beam.

9. A method for recording optically readable signals onto an optical information medium comprising the steps of:

providing an optical information medium comprising a transparent substrate for allowing a recording laser beam to penetrate therethrough, said transparent substrate comprising convex land portions provided on a surface thereof, a spiral concave tracking guide provided in the surface, recessed pre-pits for indicating address information formed in said convex land portions off-center with respect to said convex land portions and a convex rim provided between said pre-pits and said tracking guide, a recording layer formed on the transparent substrate and a reflective layer formed on the recording layer for reflecting a reproducing laser beam; and irradiating the transparent substrate with a recording laser beam to form optically readable signals on the recording layer.

10. An optical information medium as claimed in claim 3, wherein the pre-pits have an opening facing said tracking guide.

11. An optical information medium as claimed in claim 6, wherein the pre-pits have an opening facing said tracking guide and a convex rim is provided between said pre-pits and said tracking guide.

12. An optical information medium as claimed in claim 7, wherein the pre-pits have an opening facing said tracking guide and a convex rim is provided between said pre-pits and said tracking guide.

13. An optical information medium as claimed in claim 8, wherein the half-width w of the tracking guide is defined within a range, $0.23\ \mu m \leq w \leq 0.38\ \mu m$, and the half-width d of the pre-pits is defined within a range, $0.20\ \mu m \leq d \leq 0.33\ \mu m$.

14. An optical information medium as claimed in claim 8, wherein the pre-pits have an opening facing said tracking guide and a convex rim is provided between said pre-pits and said tracking guide.

* * * * *